(No Model.)

S. ARMSTRONG.
METALLIC PACKING.

No. 308,546. Patented Nov. 25, 1884.

Attest,
H. J. Theberath.
L. Lee

Inventor.
Samuel Armstrong,
per Thos. S. Crane, atty.

UNITED STATES PATENT OFFICE.

SAMUEL ARMSTRONG, OF NEWARK, N. J., ASSIGNOR OF TWO-THIRDS TO MORTON ROBINSON AND ALEXANDER McKIRGAN, OF SAME PLACE.

METALLIC PACKING.

SPECIFICATION forming part of Letters Patent No. 308,546, dated November 25, 1884.

Application filed March 22, 1884. (No model.)

*To all whom it may concern:*

Be it known that I, SAMUEL ARMSTRONG, a citizen of the United States, residing in Newark, Essex county, New Jersey, have invented certain new and useful Improvements in Metallic Packing, fully described and represented in the following specification and the accompanying drawings, forming a part of the same.

This invention consists in the combination of two rings of peculiar construction whereby both the rings may be made of the entire width of the stuffing-box, a flat bearing and close joint secured between the surfaces of adjacent packings in the same stuffing-box, and one ring be made to lock the other together when placed on the rod, before they are secured inside the box.

Figure 1:
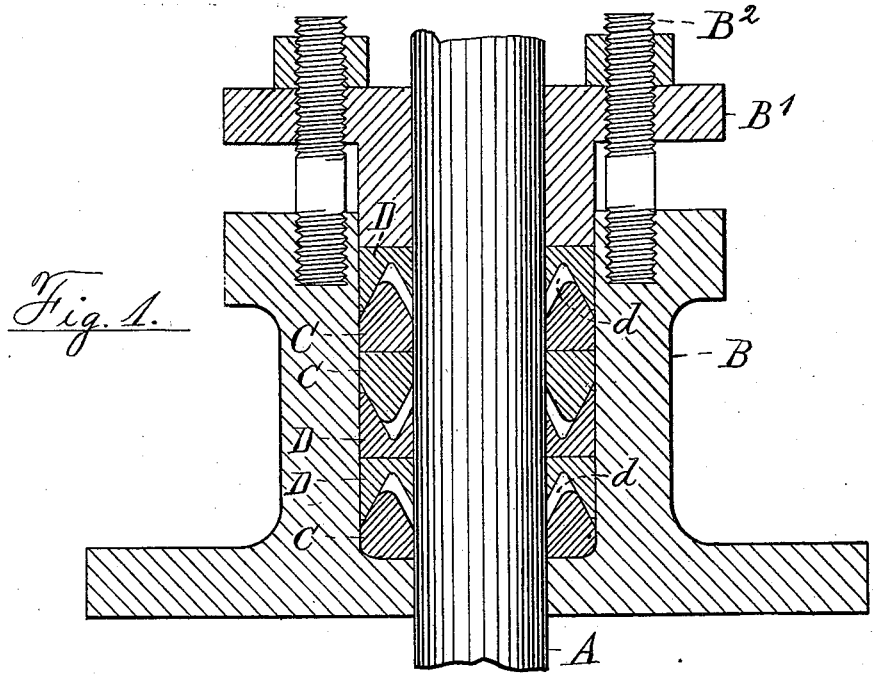
Figure 2:
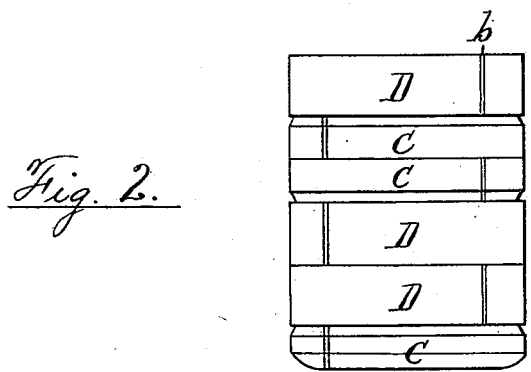
Figure 3:
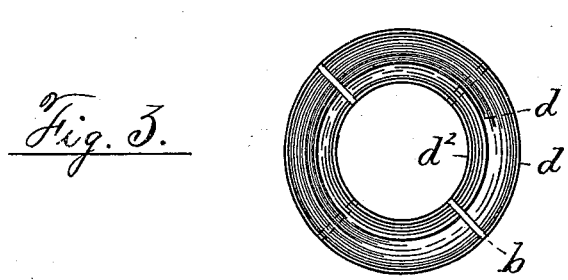
Figure 4:
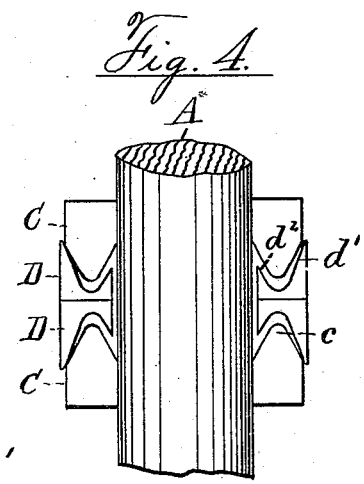

The construction will be understood by reference to the annexed drawings, in which Figure 1 is a central section of a stuffing box and rod provided with my invention; Fig. 2, an outside view of the same packing. Fig. 3 is a plan of one of the grooved rings, and Fig. 4 is a view of the rings as locked together upon the rod outside of the stuffing-box.

A is the rod, B the stuffing-box, and C D the two rings, forming the packing.

B' is the gland of the stuffing-box, preferably flattened off on the inner end, so as to bear evenly upon the outer surface of either ring; and B² are the bolts to press the packing, as usual. The ring C is shown in section at Figs. 1 and 4, and is formed with a flat surface at one side and an annular wedge-shaped projection at the other, the section of the ring thus showing a cone, c, at one side, and a flat base, c', at the other, as lettered in Fig. 4. The ring D is formed with a corresponding V-shaped groove d; but the latter is of smaller radius at its deepest part than the highest part of the wedge-shaped projection, so as to bear upon the latter only at its outer side or circumference. Both rings are cut into two or more sections, as indicated in Figs. 2 and 3 at b, and when pressed together in the stuffing-box the outer flange of the groove d (lettered d' in Fig. 4) operates to press the ring C toward the rod A and to make the desired tight joint therewith.

I am aware that rings of triangular section have been arranged so as to press one another in a similar manner, and that the use of inclined or wedging faces in packing-rings has long been known, and I do not therefore claim the same as new. In the construction of such triangular-shaped rings, however, it has been necessary to make each opposed ring of narrower width than the space in the stuffing-box between the rod and the walls of the box, thus affording an annular space for leakage of steam if the latter passed through the cuts in the rings.

My invention obviates the necessity of thus narrowing the rings, by making one ring to slide by the other when worn in a groove within the ring, thus enabling me to make both the opposed rings the full width of the space in the stuffing-box when first inserted, and thus securing a closer fit and a better joint about the rod before the packing has become fitted to the rod by wear.

The provision of the space required for clearance in setting up the rings when worn is plainly shown in Fig. 1 at the hollow space there lettered at the groove *d*; and it will be seen in the same view that as the rings D are pressed by their working action entirely against the walls of the stuffing-box there can be no wear whatever upon them, and that they will always retain their full width and closely fill the stuffing-box around the rod.

Although the flange inside of the groove *d* (lettered d² in Fig. 4) has no bearing upon the opposite ring when in use, it serves three important functions, which make the grooved ring D quite different from a plain wedging-ring such as has been used heretofore, as its base serves to form the inner part of the flat surface, which fills the stuffing-box in a very desirable manner. Its strength serves to sustain the pressure upon such part of the base, and thus prevents the cut sections of the ring D from tipping over and wearing crooked, its inner cylindrical surface also preventing such tipping, and serving to make a close fit around the rod until the rings C become fitted perfectly thereto by wear; and, finally, it serves to lock the cut pieces of the opposite ring together when placed upon a vertical rod before they are secured in the stuffing-box. This function is illustrated in Fig. 4, in which a vertical rod is shown with two pairs of my improved packing-rings pressed together thereon, the cuts $b$ in such rings permitting the parts to come in close contact, so that the projection $c$ penetrates the groove $d$ fully, the cuts being alternated in the usual manner, so that the opposed parts lock and hold one another together.

In applying metallic packings to the inverted stuffing-boxes of vertical and propeller engines the separate sections of such packings frequently require to be bound together by an encircling cord or wire after they are placed upon the rod to get them into the stuffing-box in the right relation to one another; but such cord will not enter the stuffing-box, and considerable difficulty is caused in adjusting such rings partially inside the box before removing such cord or wire, lest the packing all drop apart. By the construction I employ one or more sets of the packing-rings can be readily applied to such a rod and box, as the operator can readily hold any one of the rings C or D together on the rod, and the remainder will then all rest securely upon it. By the construction shown I therefore secure many advantages not attained heretofore, and by an equally simple construction, including a very perfect barrier to the escape of steam, which is secured by the large surfaces in contact with the rod, the stuffing-box, and the adjacent packing in the same box. These surfaces are shown at $d'$ and at the flat bases of the rings C and D, as at $c'$, and as the operation of the packing does not impose any wear upon their face it is obvious that they will remain permanent when in use.

I am fully aware that many arrangements of rings made in sections and grooved in various manners have been already used, and do not therefore claim herein any other construction than that I have specifically shown and described.

What I claim as my invention is—

1. The metallic packing constructed, as herein shown and described, with two rings, C and D, the ring C being formed with a wedge-shaped annular projection, $c$, and the other with an annular wedge-shaped groove, $d$, of smaller radius than the opposed projection, the rings being cut and pressed together when in use, substantially as shown and described.

2. The combination, in a metallic packing, of the series of rings C and D, constructed with external flat surfaces and internal wedge-shaped grooves and projections described, and arranged in the stuffing-box with the flat surfaces of the same kind of ring in contact, as and for the purpose set forth.

In testimony whereof I have hereunto set my hand in the presence of two subscribing witnesses.

SAMUEL ARMSTRONG.

Witnesses:
   THOS. S. CRANE,
   L. LEE.